United States Patent [19]

Simpson, III

[11] Patent Number: 5,085,541

[45] Date of Patent: Feb. 4, 1992

[54] METAL-CUTTING INSERT

[75] Inventor: Vandell E. Simpson, III, Kent, Ohio

[73] Assignee: Manchester Tool Company, Akron, Ohio

[21] Appl. No.: 582,677

[22] Filed: Sep. 13, 1990

[51] Int. Cl.⁵ ............................................. B26D 1/00
[52] U.S. Cl. ................................. 407/110; 407/50; 407/117
[58] Field of Search .............. 407/117, 110, 116, 50, 407/109

[56] References Cited

U.S. PATENT DOCUMENTS

| | | | |
|---|---|---|---|
| D. 275,760 | 10/1984 | Cochran | D15/139 |
| D. 278,716 | 5/1985 | Pano | D15/139 |
| 28,518 | 8/1975 | Stein | 29/95 R |
| 174,216 | 2/1976 | Emerson | 83/845 |
| 246,703 | 9/1981 | Atkins | 83/845 |
| 1,295,171 | 2/1919 | Hunter | 83/836 |
| 2,422,111 | 6/1947 | Lundberg | 83/844 |
| 3,128,804 | 4/1964 | Scott | 83/855 |
| 3,523,349 | 8/1970 | Pollington et al. | 407/68 |
| 3,673,657 | 7/1972 | Gustafson et al. | 29/105 |
| 3,748,710 | 7/1973 | Lynch | 29/96 R |
| 3,785,021 | 1/1974 | Norgren | 29/96 |
| 4,357,123 | 11/1982 | Zweekly | 407/110 |
| 4,363,576 | 12/1982 | Zweekly | 407/50 |
| 4,558,974 | 12/1985 | Pano | 407/50 |
| 4,580,930 | 4/1986 | Zinner | 407/110 |
| 4,583,887 | 4/1986 | Wertheimer | 407/116 |
| 4,588,333 | 5/1986 | Gustafson | 407/117 |
| 4,604,004 | 8/1986 | Armbrust | 407/110 |
| 4,629,372 | 12/1986 | Huston | 407/116 |
| 4,645,385 | 2/1987 | Keller | 407/105 |
| 4,744,703 | 5/1988 | Cochran | 407/45 |
| 4,801,224 | 1/1989 | Pettersson et al. | 407/110 |
| 4,909,677 | 3/1990 | Noguchi et al. | 407/117 |

FOREIGN PATENT DOCUMENTS 3942585 7/1990 Fed. Rep. of Germany ...... 407/110

OTHER PUBLICATIONS

Manchester Face Grooving and Trepanning Tools, Bendix Manchester Div, Form 330 F (Nov. 1981).
Manchester M40 Catalog, Form 383A (1985) Manchester Tool Co.
The Separator, Form 376D (1987) Manchester Tool Co.
Manchester Hardinge, Form 384 (1986) Manchester Tool Co.
Manchester & Modern Cutting-Off Machines-Productivity, Form 385 (1986) Manchester Tool Co.
Carboloy, 150.10 Cut-Off System (Supplement to Catalog).
The Iscar Self-Grip System-F (May 1984) Iscar Metals, Inc.
Newcomer Products Inc., advertisement.
Plansee, Program Extension Catalog.
Sandvik Coromant Co., T-Max Q-Cut Parting Tools (before Oct. 1988).

Primary Examiner—Larry I. Schwartz
Assistant Examiner—Kevin Carroll
Attorney, Agent, or Firm—Watts Hoffmann Fisher & Heinke

[57] ABSTRACT

A metal-cutting insert for performing cut-off and grooving operations and of the so-called self-gripping type. The insert comprises a front end with a cutting edge, first and second elongated straight grippable surfaces extending in converging relationship rearwardly from the front end and a rear end defined by first and second straight surfaces of approximately equal length that intersect each other in an included obtuse angle. The grippable surfaces each have a concave transverse contour. The first and second end surfaces extend respectively from the first and second grippable surfaces and intersect at a location to coincide with the intersection of a rear locating surface and a key-receiving aperture of a support blade when the insert is fully received within the support blade recess.

4 Claims, 2 Drawing Sheets

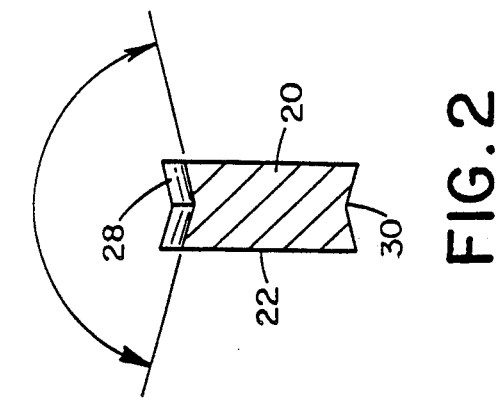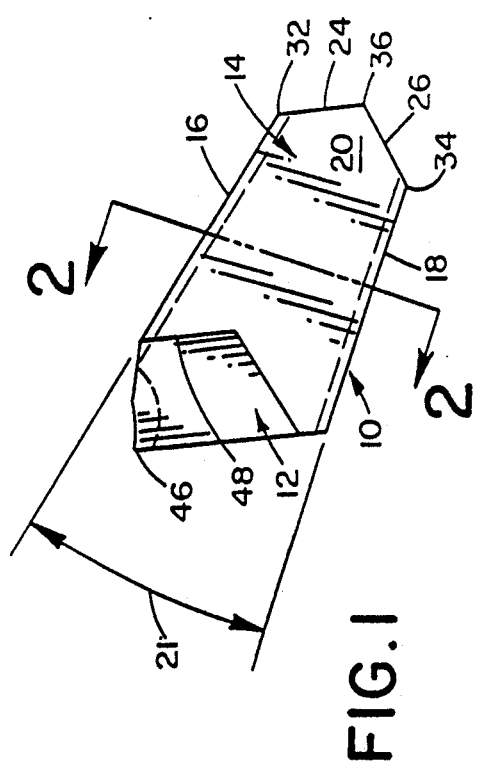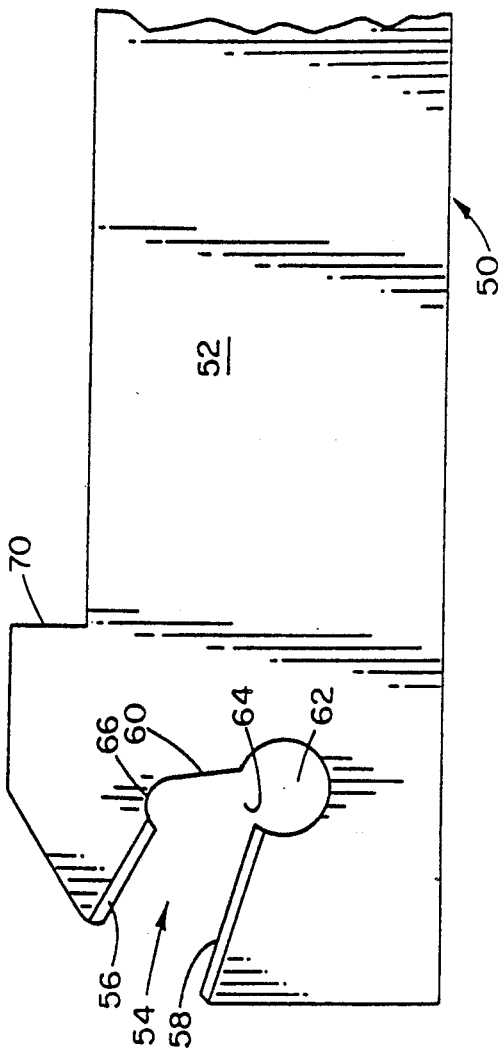

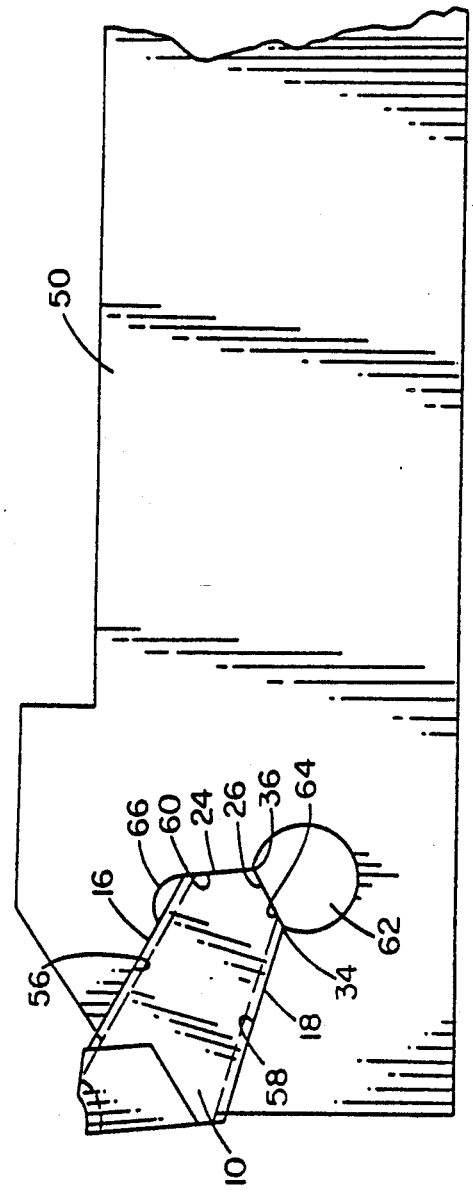
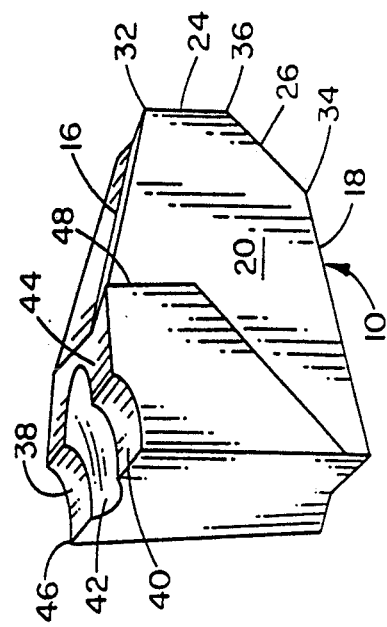
FIG. 4
FIG. 5

METAL-CUTTING INSERT

TECHNICAL FIELD

The present invention relates generally to the field of metal cut-off and grooving, and more specifically to an improved self-gripping metal-cutting insert mountable on a rigid support blade.

BACKGROUND OF THE INVENTION

One technique for cutting or grooving metal is to rotate the workpiece (for example, by fixing the workpiece in a rotating workholder or chuck) and advance a rigid cutting edge against the workpiece. A preferred form of cutting tool for this purpose comprises a rigid support blade which mounts a removable cutting insert which acts as the cutting edge of the tool.

In order to avoid excessive down time during the replacement of a worn insert, it is desirable that the insert be mounted on the support blade so that the insert may be removed again quickly and easily. One popular style of mounting uses so-called "self-gripping" inserts, which frictionally engage a recess in a forward end of the support blade without additional fasteners.

A drawback to the use of self-gripping inserts is that the accuracy of the cut may be difficult to control. One conventional design for support blades has an insert-receiving recess that tapers linearly inward from the front edge and terminates in a circular aperture that minimizes stress concentrations on the inner surface of the recess and facilitates the removal of the insert. When the insert is pressed against a workpiece, the reaction from the workpiece tends to push the insert farther back into the workpiece. Since the depth and center-line of the cut are determined relative to the insert as seated in the blade prior to cutting, the accuracy of the depth and center-line may be difficult to control over an extended production run.

One advantage of the conventional insert and support blade design with a tapered recess terminating in a circular aperture is ease of removal of the insert. In order to remove the insert, a camming tool is introduced into the aperture at the back of the insert-receiving recess and turned. One side of the camming tool engages the back of the aperture while the other side engages a flat back face of the insert to push the insert forward out of the recess.

Even this advantage may be neutralized by movement of the insert into the blade during cutting. If the insert is pushed sufficiently far back into the insert-receiving recess during a production run, it may become difficult to introduce the camming tool into the aperture behind the insert in order to remove the insert from the blade.

Various approaches have been used to more positively position a self-gripping insert in its recess, as by providing a rearwardly facing surface on the insert and a forwardly facing surface adjacent the recess arranged so the two surfaces abut and positively limit movement of the insert into the recess. In particular, one popular insert design provides a rearwardly facing surface near the back of the upper chip forming or breaking surface of the insert which abuts against the upper lip of the recess to limit movement of the insert into the blade. Another conventional design provides a narrow projection from the back of the recess which abuts against a back surface of the insert. Neither of these solutions provides an optimal degree of support against rearward movement of the insert.

Many conventionally designed inserts have flat rear surfaces facing the aperture into which the camming tool is introduced. Since the rear surface is flat, the camming tool may be turned either clockwise or counter-clockwise to remove the insert from the blade.

DESCRIPTION OF THE INVENTION

The present invention provides a new and improved self-gripping insert that cooperates with a specially formed recess in a support blade to both positively position the insert and facilitate removal. The metal-cutting insert comprises a body portion and a cutting edge portion. The body portion comprises first and second grippable faces separated by side faces. The body portion also comprises first and second rear faces of substantially equal length. Each of the rear faces extends rearwardly from the rear of one of the grippable faces to a common vertex where they meet to form an obtuse angle. One of the rear faces is designed to abut along substantially its entire length with an abutment surface of a support blade while the other of the rear faces is designed to span a key-receiving aperture in such support blade and engage with an insert removal tool.

According to a preferred embodiment of the invention, one of the grippable faces and the cutting edge portion together form a continuous upper profile without any interrupting abutment surface to act as a stop to retard the movement of the insert into the key-receiving aperture. Thus, an exposed outer edge of the support at the mouth of the insert-receiving recess is not relied upon to locate the insert.

In the preferred embodiment of the invention, the grippable faces converge rearwardly, preferably at an angle no less than 12.5°, from adjacent the cutting edge portion of the insert. In an especially preferred embodiment of the invention, the grippable faces have a concave contour for positioning and frictionally engaging mating convex insert-gripping surfaces of a support blade. Preferably, the concave contour is a concave "V" contour with an interior angle of no greater than 142°.

More specifically, a preferred embodiment of the invention is a metal-cutting insert of the so-called self-gripping type suitable for performing cut-off and grooving operations. The insert is adapted for use with a support blade that has a recess with opposed first and second insert-gripping surfaces that converge inwardly of the recess in which a body portion of the insert is adapted to be received and frictionally gripped by the surfaces. The recess into which the insert is adapted to be received has a straight insert-locating surface at the rear of the recess that terminates at a relief contour at the inward end of the first gripping surface and at its other end at a key-receiving aperture that intersects with the inward end of the second gripping surface, the aperture serving to facilitate removal of the gripped insert. The insert comprises a front end with a cutting edge, first and second elongated straight grippable surfaces extending in converging relationship rearwardly from the front end, and a rear end defined by first and second straight surfaces of approximately equal length that intersect each other in an included obtuse angel. The grippable surfaces each have a concave transverse contour. The first and second end surfaces extend respectively from the first and second grippable surfaces and intersect at a location to coincide with the intersection of the rear locating surface and the key-receiving aperture when the insert is fully received within the support blade recess.

Since one of the straight rear surfaces of the insert abuts against a rear surface of the recess, the force on the workpiece tending to press the insert into the recess is countered by a reaction force from the abutting surface of the support blade. The rear support prevents the insert from moving during a production run, and the depth and center-line of the cut are maintained. Nonetheless, since the other of the rear surfaces spans the key-receiving aperture, an operator removing the insert by means of a insert removing tool introduced into the aperture may turn the camming tool either clockwise or counter-clockwise to remove the insert. Advantageously, the entire straight rear locating surface of the insert is contacted by the abutting surface of the support blade to minimize distortion.

The above and other features and advantages of the invention will become better understood by those skilled in the art from the following description of the preferred embodiment read in conjunction with the accompanying drawings.

BRIEF DESCRIPTION OF THE DRAWINGS

FIG. 1 is a side elevational view of a preferred metal-cutting insert embodying the present invention, with the front portion of the insert facing toward the left;

FIG. 2 is a cross-sectional view of the insert of FIG. 1 viewed from line 2—2 in FIG. 1;

FIG. 3 is a side-elevational view of a preferred support blade adapted for use with the preferred insert;

FIG. 4 is a side-elevational view of the insert of FIG. 1 engaged with an insert receiving recess in the support blade of FIG. 2, with the front portions of the insert and blade facing toward the left; and FIG. 5 is a perspective view of the insert of FIG. 1.

DETAILED DESCRIPTION OF A PREFERRED EMBODIMENT

Referring now to the drawings, the cutting insert 10 comprises a cutting edge portion 12 and a body portion 14. The body portion comprises two grippable surfaces or faces 16, 18 separated by side faces 20, 22 (FIG 2), as well as two rear faces 24, 26 which constitute the back end surfaces of the insert.

The grippable faces 16, 18 are preferably straight and converge rearwardly (i.e., rightwardly in FIG. 1) from the cutting edge portion of the insert, preferably at an angle 21 of approximately 12.75°, so that the insert is tapered downward in height from front to back. Furthermore, as see in FIG. 1, the grippable faces 16, 18 have concave profiles 28, 30, preferably "V" profiles with internal angles of approximately 142°.

Each of the rear faces 24, 26 extends from a rear of one of the grippable faces 16, 18, as at 32, 34, to a common vertex 36 where rear faces 24, 26 meet to form an obtuse angle of preferably about 110°. Rear faces 24, 26 are preferably straight with a flat profile and of substantially equal length.

The side faces 20, 22 are preferably parallel and flat in profile. The width of the body portion 14 of the insert 10 should be approximately the same as the width of the support blade into which the insert is to be introduced.

As best seen in FIG. 4, the preferred cutting edge portion 12 comprises rake portions 38, 40 separated by a longitudinal channel 42 and a substantially planar top portion 44. The curved shelf-shaped rake portions 38, 40 extend back from the front cutting edge 46 of the insert 10 to the top portion 44. During a cutting or grooving operation, the longitudinal channel 42 acts to narrow a chip while the rake portions 38, 40 curl the chip to the point of breaking into desirable "clock-spring" or figure-nine shapes. For a more detailed discussion of the cutting edge portion design, see commonly-assigned U.S. Pat. No. 4,629,372 to Huston, the disclosure of which is incorporated herein by reference.

As best seen in FIGS. 1 and 5, the cutting edge 46 is wider than the body portion 14 of the insert 10. The sides of the cutting edge portion 12 converge linearly rearwardly and downwardly to meet with the width of the body portion 14 along a fillet 48.

Preferred materials for the insert 10 include carbide, ceramic or cermet materials which are familiar constituents for cutting inserts well known to those skilled in the art of metal-cutting.

A preferred support blade 50 adapted for use with the insert 10 of the invention comprises a shank 52 and an insert-receiving recess 54. The recess 54 is defined by a pair of insert-gripping surfaces 56, 58 and terminates in a rear abutment surface 60 and a key-receiving aperture 62. Depending on the size of the shank 52 and the position of the recess 54, a "beard" 70, may be added to increase the elasticity of the upper gripping surface 56 and prevent the blade from failing due to the upward forces applied on the insert during a cutting operation.

The two insert-gripping surfaces 56, 58 are straight and converge rearwardly so as to grip the rearwardly converging grippable faces 16, 18 of the insert 10. Furthermore, each of the gripping surfaces 56, 58 has a convex profile which mates with the concave profile of the grippable faces 16, 18 to position the insert 10 in the recess 54 and to secure the insert 10 against transverse movement during cutting or grooving operations.

At the back of the recess 54 are a rear abutment (or insert-locating) surface 60 and a key-receiving aperture 62. The rear abutment surface 60 has a straight, flat profile preferably at least as long as the rear face 24 of the insert 10 for abutment by the rear face 24 when the insert is introduced into the recess 54. The key receiving aperture 62 has a generally circular cross-section except for an opening 64 that is adjacent to one end of the rear abutment surface 60 and that connects the key-receiving aperture 62 with the space between the gripping surfaces 56, 58. Adjacent to the other end of the rear abutment surface 60 is a relief 66 in the shape of a circular arc which serves to decrease the stress concentration at the junction between the rear abutment surface 60 and the gripping surface 56.

To some degree, the elasticity of the upper gripping surface 56 of the blade 50 may be controlled by controlling the diameter of the relief 66 and the thickness of the beard 70. Decreasing the thickness of the beard 70 decreases the stiffness of the upper gripping surface 56, but also increases the likelihood of failure of the blade 50 during a metal-cutting operation. Decreasing the diameter of the relief 66 increases the stiffness of the upper gripping surface 56, but also increases the stress concentration at the junction between the gripping surface 56 and the rear abutment surface 60, thereby increasing the chances of blade failure during a cutting operation.

When the insert 10 is pushed into the insert-receiving recess 54 in the blade 50, the grippable faces 16, 18 of the insert 10 frictionally engage the gripping surfaces 56, 58 of the blade 50. As the rearwardly converging insert 10 is pressed into the recess 54, the gripping surfaces 56, 58 are pushed apart by the insert so that the gripping surfaces 56, 58 exert an elastic force on the grippable faces 16, 18 of the insert 10 which generates sufficient friction to hold the insert 10 in place in the insert-receiving recess 54 during a metal-cutting operation. The mating of the convex contour of the gripping surfaces 56, 58 with the concave contour of the grippable surfaces 16, 18 limits the transverse movement of the insert 10 during a cutting operation. It is these features which make the insert 10 "self-gripping" in the sense of resisting movement without the need for external fasteners.

The insert 10 is positioned in the recess 54 by means of the mating between the gripping surfaces 56, 58 with the grippable faces 16, 18 and the abutment of the rear face 24 of the insert 10 with the rear abutment surface 60 of the blade 50. One feature of the present invention is that the rear face 24 abuts the rear abutting surface along substantially its entire length. As a consequence, the insert 10 is more securely positioned in the recess 54 than would be the case if the rear abutment comprised an extension from an inner end of an insert-receiving recess which engaged only a portion of a rear face of a self-gripping insert.

In a preferred mode, the insert 10 is free to move into the recess 54 until the rear face 24 abuts against the rear abutment surface 60.

Another feature of the present invention is that the rear face 26 of the insert 10 spans the key-receiving aperture 62. That is, the vertex 36 between the rear faces 24, 26 of the insert 10 contacts the rear abutment face 60 of the blade 50 and the vertex 34 between the rear face 26 and the lower grippable face 18 contacts the lower gripping surface 58 when the insert 10 is positioned in the insert-receiving recess 54. According to a preferred embodiment of the invention, the vertex 34 contacts the gripping surface 58 substantially at the juncture of the opening 64 with the lower gripping surface 58 while the vertex 36 contacts the rear abutment surface 60 substantially at the junction between the opening 64 and the rear abutment surface 60.

With that structure, the insert 10 may be removed from the insert-receiving recess 54 by inserting a camming tool (not shown) into the key-receiving aperture 62 and turning the camming tool either clockwise or counter-clockwise. Were the lower grippable face 18 of the insert 10 to extend substantially into the aperture 62 when the insert 10 is positioned in the recess 54, the insert 10 could not be removed by introducing a camming tool into the aperture 62 in a direction corresponding to a movement into the plane of FIG. 4 and turning the tool clockwise since the camming tool would engage the grippable face 18 rather than the rear face 26. The camming tool would push the insert 10 upward against the upper gripping surface 56 and the rear abutment surface 60 rather than outward from the recess 54. Likewise, were the rear face 24 to extend into the aperture 62, the camming tool would engage the face 24 rather than the face 26 when rotated clockwise. Also, if the angle between the rear faces 24, 26 is not obtuse, introducing a camming tool into the aperture 62 in a direction corresponding to a movement into the plane of FIG. 4 and turning the tool clockwise would likely push the insert 10 upward rather than outward from the recess 54. Finally, if the rear surface 26 is too small, the back of the insert 10 may seat so far back into the key-receiving aperture 62 that it would be difficult to introduced a camming tool into the aperture 62 to remove the insert 10 from the recess 54.

Variations and modifications of the invention will be apparent to those skilled in the art from the above detailed description. Therefore, it is to be understood that, within the scope of the appended claims, the invention can be practiced otherwise than as specifically shown and described.

I claim:

1. A metal-cutting insert suitable for performing cut-off and grooving operations and of the so-called self-gripping type adapted for use with a support blade that has a recess with opposed first and second insert-gripping surfaces that converge inwardly of the recess in which a body portion of the insert is adapted to be received and frictionally gripped by said surfaces and that has a straight insert-locating surface at the rear of the recess that terminates at one end at a relief contour that intersects with an inward end of the first gripping surface and at the other end at a key-receiving aperture that intersects with an inward end of the second gripping surface, the aperture serving to facilitate removal of the gripped insert, said insert comprising:

a front end with a cutting edge, first and second elongated straight grippable surfaces extending in converging relationship rearwardly from the front end, with a concave transverse contour, and a rear end defined by first and second straight end surfaces of approximately equal length that intersect each other in an included obtuse angle, the first and second end surfaces extending respectively from the first and second grippable surfaces, the intersection of the end surfaces being located on the insert at a location to coincide with the intersection of the insert-locating surface and the key-receiving aperture when the insert is fully received within the support blade recess.

2. A metal-cutting insert according to claim 1 wherein the entire length of said first end surface is constructed to abut said insert-locating surface when the insert is fully received within the support blade recess.

3. A metal-cutting insert according to claim 1 wherein said second end surface is constructed to span the key-receiving aperture from the inward end of the second insert gripping surface to the other end of the insert-locating surface.

4. A metal-cutting insert according to claim 2 wherein said second end surface is constructed to span the key-receiving aperture from the inward end of the second insert gripping surface to the other end of the insert-locating surface.

* * * * *